Patented Oct. 30, 1923.

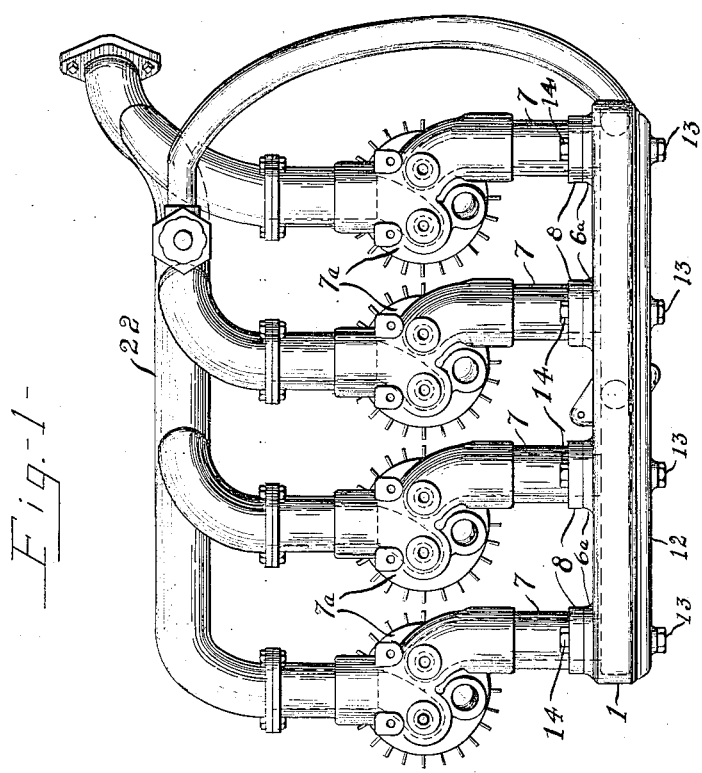

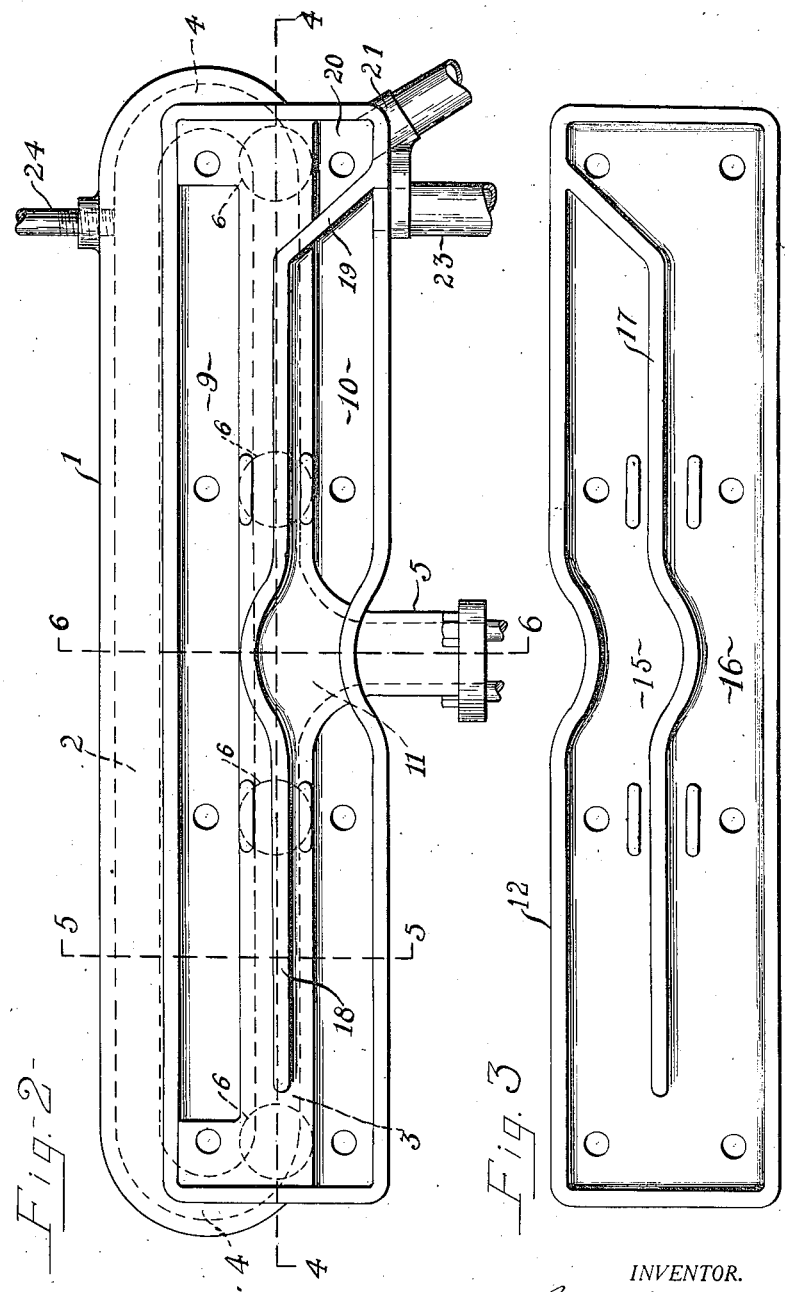

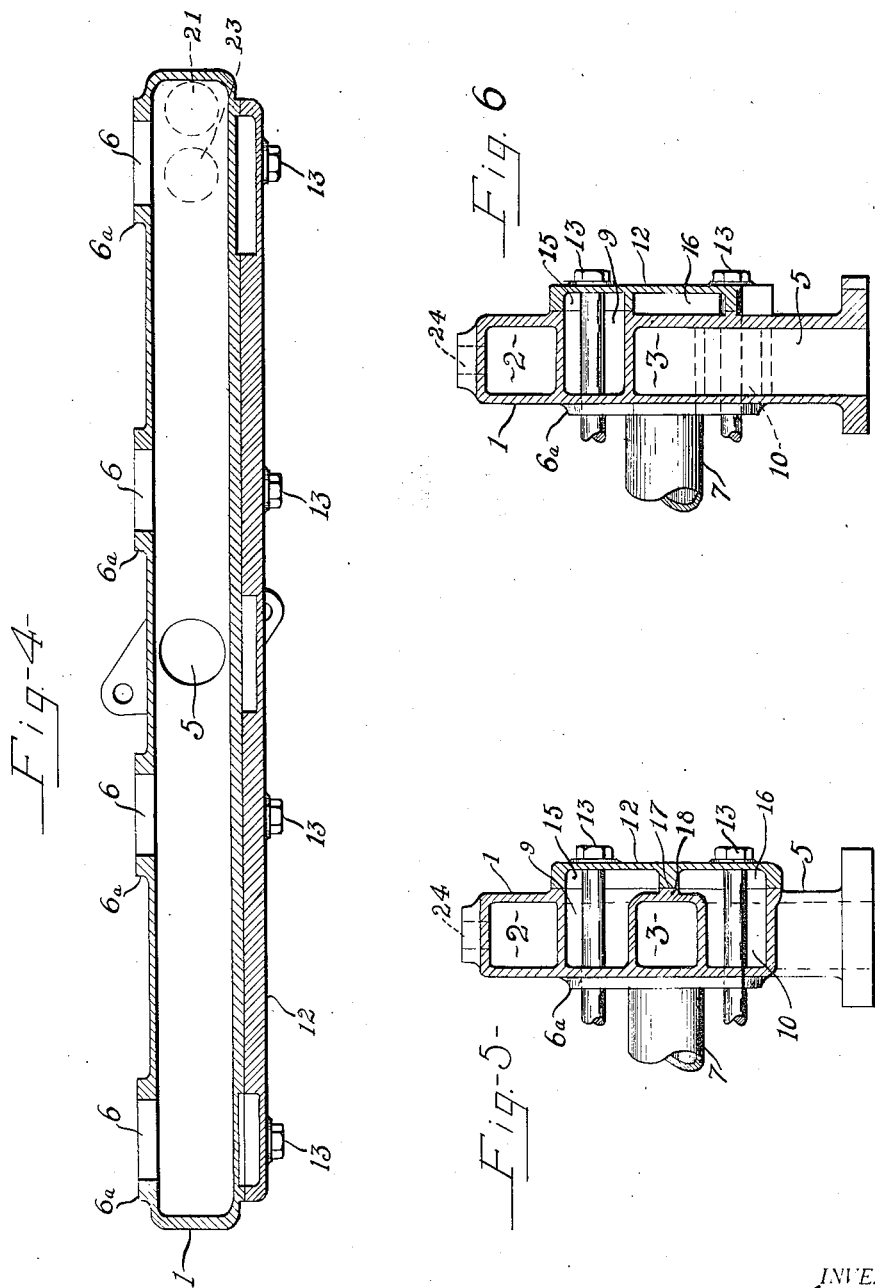

1,472,449

UNITED STATES PATENT OFFICE.

JAMES L. YARIAN, OF SYRACUSE, NEW YORK, ASSIGNOR TO H. H. FRANKLIN MFG. COMPANY, OF SYRACUSE, NEW YORK, A CORPORATION OF NEW YORK.

INTAKE MANIFOLD FOR INTERNAL-COMBUSTION ENGINES.

Application filed December 26, 1919. Serial No. 347,622.

*To all whom it may concern:*

Be it known that I, JAMES L. YARIAN, a citizen of the United States, residing at Syracuse, in the county of Onondaga and State of New York, have invented a certain new and useful Intake Manifold for Internal-Combustion Engines, of which the following is a specification.

This invention has for its object an intake manifold for internal combustion engines, which is particularly simple and compact in construction, readily accessible, removable and replaceable and highly efficient and durable in use; and it consists in the novel features and in the combinations and constructions hereinafter set forth and claimed.

In describing this invention, reference is had to the accompanying drawings, in which like characters designate corresponding parts in all the views.

Figure 1 is a plan view of this intake manifold, the same being shown as applied to an internal combustion engine.

Figure 2 is an outer face view, the detachable cover plate for the heating chambers, being removed.

Figure 3 is an inner face view of the cover plate, removed from Figure 2.

Figures 4, 5 and 6 are respectively, sectional views taken on lines 4—4; 5—5; and 6—6, Figure 2.

This intake manifold comprises generally a body formed with an internal lengthwise gas passage having outlet ports at intervals and a depending inlet pipe and also a heating chamber extending along said passage, said passage and chambers being formed in a single casting and the heating chamber being open at its outer side and a cover plate for the outer side of the heating chamber.

I have shown my invention as embodied in a manifold of what is known as the trombone type, that is, a manifold consisting of upper and lower pipes connected together by bends at their ends, the lower pipe having a depending inlet for connection to the carburetor, the whole having resemblance to a trombone.

1 designates the body, which is formed with upper and lower horizontal passages 2, 3, which are connected at their ends by curved passages 4. 5 is a depending pipe which communicates centrally with the lower passage 3. One of these passages, as the lower passage, is provided with outlets 6 at intervals for communication with the intake ports 7 of the engine cylinders 7ª. These passages 6 pass through bosses 6ª having their outer end faces flat and meeting complemental faces formed on flanges 8 at the outer ends of the intake port 7 of the engine. The manifold is secured to said ports 7, as will be hereinafter described.

In the illustrated form of my invention, the heating chambers extend lengthwise of the passages 2, 3, one of these chambers extending between the passages 2, 3, and the other extending along the lower side of the lower passage 3. 9 designates the heating chamber located between the passages 2, 3, and 10 the chamber located below the lower passage 3, the chamber 10 extending on opposite sides of the intake pipe 5 and having a portion 11 extending over or around the outer side of said pipe. Said chambers are open at their outer sides and are normally covered by a plate 12 secured in position by bolts 13 extending through the plate and the body and also through the rear walls of the heating chamber and through the bosses 6ª and the flanges 8 at the outer end of the port 7.

Nuts 14 turn on the inner ends of the bolts against the flanges 8, the bolts and nuts serving to hold the manifold in position. As here shown, the plate 12 is recessed at 15 and 16, which recesses are alined with the chambers 9 and 10 respectively and extend said chambers outwardly beyond the outer face or wall of the heating chamber 3 and along the outer side thereof, and these recesses 15 and 16 form an internal rib, or partition 17 which abuts against the outer wall of the chamber 3, or a rib 18 thereon, and forms a septum or partition separating the heating chambers 9 and 10. As here illustrated, the septum or partition at one end, as at the right end of the manifold, extends downwardly across the lower chamber 10, as at 19, and thus forms an enlargement 20 at the corresponding end of the heating chamber 9. An inlet 21 for the heated gases from the exhaust manifold 22 of the engine is connected to said extension 20 and an outlet pipe 23 is connected to the corresponding end of the chamber 10. This outlet pipe may exhaust either into the open air or into the pipes leading under the body of the vehicle on which the engine is mounted. The manifold is provided with a suitable connection 24 for the vacuum fuel feeding system.

This manifold is particularly advantageous in that it provides a particularly simple way of applying heating chambers to manifolds of the trombone type, especially manifolds used in connection with air cooled engines, where the cylinders are not cast en bloc.

What I claim is:

1. An intake manifold for internal combustion engines comprising a body formed with upper and lower substantially parallel fuel passages communicating at their ends and an inlet passage pending from the lower passage, outlet ports leading laterally from the lower passage, a box enclosing the lower passage and the inlet passage, the box being open at one side and having an inlet and an outlet for the heating medium, and a cover plate for the open side of the box, substantially as and for the purpose set forth.

2. An intake manifold for internal combustion engines consisting of a unitary structure comprising a body formed with a passage having discharge ports and an inlet passage intermediate of its ends, the body being also formed with heating chambers extending lengthwise of the passage above and below the same, the chambers being open at their outer side and a plate covering said open side, substantially as and for the purpose set forth.

3. An intake manifold for internal combustion engines consisting of a unitary structure comprising a body formed with a passage having discharge ports and a depending inlet passage intermediate of its ends, the body being also formed with heating chambers extending lengthwise of the passage above and below the same, the chambers being open at their outer sides and a plate covering said open side, said chamber extending between the plate, the outer side of said passage, and a partition extending between the outer wall of said passage and the plate forming a partition separating the chambers, substantially as and for the purpose described.

In testimony whereof I have hereunto signed my name, at Syracuse, in the county of Onondaga, and State of New York, this 11th day of December, 1919.

JAMES L. YARIAN.